Patented Apr. 30, 1929.

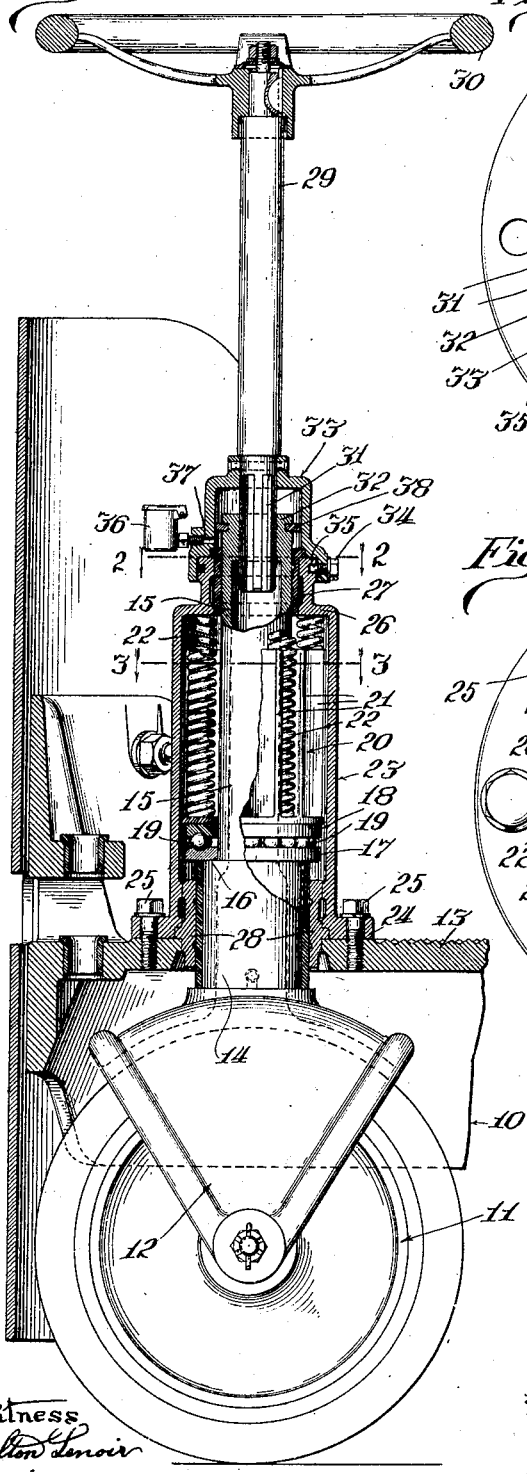
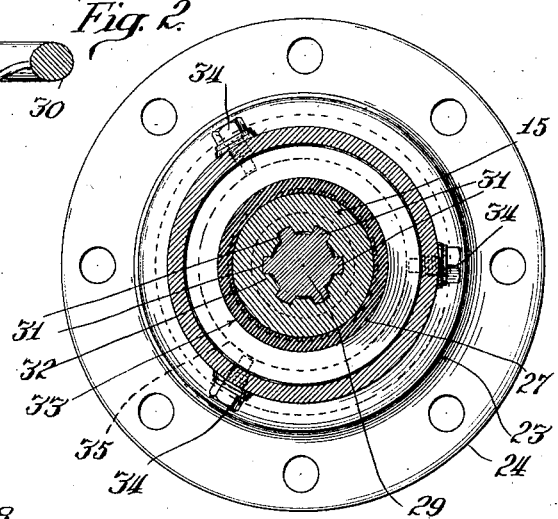
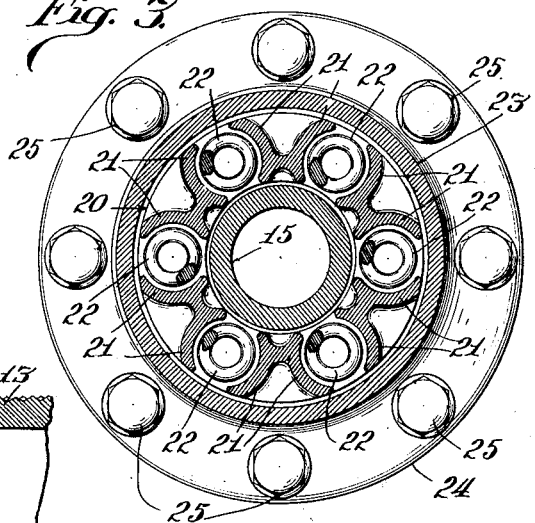

1,711,223

UNITED STATES PATENT OFFICE.

FREDERICK W. BURGER, OF NILES, AND BERGER STOCKFLETH, OF BERRIEN SPRINGS, MICHIGAN, ASSIGNORS TO CLARK TRUCTRACTOR COMPANY, OF BUCHANAN, MICHIGAN, A CORPORATION OF MICHIGAN.

STEERING APPARATUS FOR MOTOR VEHICLES.

Application filed December 31, 1923. Serial No. 683,720.

This invention relates to improvements in steering apparatus for motor vehicles, and while primarily designed for use in connection with comparatively small vehicles of the kind that are employed for pushing or pulling trucks in and around shops, railway stations and other places for the moving of articles of various kinds from place to place, is not necessarily limited to that particular type of vehicle.

The objects of the invention are to provide in connection with the steering post an improved yieldingly-supported connection between the front dirigible supporting wheel and the frame of the machine, and to so connect the steering post therewith that the vertical movements of the said dirigible wheel that are caused by such wheel passing over uneven surfaces will not be imparted to such post and to the operator who has hold of the usual steering wheel that such post carries at its upper end; to provide improved means for lubricating the bearings for the vertical standard that rises from the yoke connected with the said dirigible supporting wheel; and to improve in various details the construction and arrangement of mechanism of the kind referred to. These objects we accomplish as shown in the drawing and hereinafter particularly described. That which is believed to be new will be set forth in the claims.

In the drawing,—

Fig. 1 is a view showing in vertical section our improvements, some parts being shown as partly broken away; and Figs. 2 and 3 are enlarged horizontal sections taken respectively on lines 2—2 and 3—3 of Fig. 1.

Referring to the several figures of the drawing,—10 indicates the front portion of the frame of a shop tractor upon which will be mounted the motor and other operating parts, but which parts are not shown, as they may be of any ordinary construction and arrangement and form no part of our present invention. As here shown, this forward part of the frame has as its wheeled support a single wheel 11 that is partially enclosed by and rotatably mounted between the sides of a yoke 12. Rising centrally from this yoke, and of course rigidly connected therewith, is a vertical standard that projects through an opening in the platform 13 that extends across the frame and is secured to such frame in any suitable manner. This standard, as shown by the dotted lines on Fig. 1, is preferably hollow or cored out throughout its length, but might of course be of solid construction except at its upper end where it should be cored out sufficiently to receive the end of the steering post, as hereinafter described. The standard is indicated by the numerals 14, 15, the lower portion 14 being of sufficiently greater diameter than the remaining portion 15 to provide an annular shoulder 16 upon which is mounted an ordinary anti-friction device comprising a lower ring 17 and an upper ring 18, which together form raceways for a series of balls 19—the raceway plate 17 resting directly upon said shoulder 16. Fitting around the portion 15 of the standard is a cage that comprises an annular base 20 and a plurality of arms 21 that rise from the base 20, said arms being spaced at equal distances apart and rising to a considerable height alongside of and parallel with the member 15 of the standard. These arms have their faces curved so as to form between adjacent arms pockets each adapted to receive and hold a strong coiled spring which rests upon the plate member 20, such coiled springs being indicated by 22.

23 indicates a casing annular in cross-section that surrounds the spring-retaining cage and, as shown in Fig. 3, forms the outer wall of the pockets in which the springs are located. This casing at its lower end is shown as provided with a flange 24 that rests upon the surface of the platform 13 and is secured thereto by bolts 25. The upper end portion of the casing is of smaller diameter than the main or body portion, thus providing an annular shoulder 26 which extends over the upper ends of the various coiled springs 22, and takes their end thrust. It will be evident that, inasmuch as the springs are thus confined between the plate 20 of the cage and the upper end of the casing 23, such springs will act to normally hold the guiding wheel 11 down, although when such wheel passes over an obstruction the springs will yield sufficiently to compensate therefor without a corresponding movement being imparted to the frame of the machine.

The upper portion 15 of the standard is provided with a bearing 27, which is removably fitted in the upper end portion of the casing 23, by providing it, preferably, at its upper end, with a radial flange 27ª that is adapted to project over and rest upon the upper marginal portion of the casing, as best shown in Fig. 1. Said bearing fits snugly in the bore of the upper portion of the casing, but may be removed by moving it upwardly. The lower portion 14 of the standard is provided with a pilot bearing 28 which is located below the ring 17 and is removably secured between the lower end portion of the casing 23 and the upper surface of the frame 13, as also shown in Fig. 1. Said bearing is provided with an annular rib 28ª on its outer surface, which rests upon the upper marginal portion of the frame 13 around the opening through which the standard 14 extends, and fits into an offset portion or recess formed in the lower inner marginal portion of the casing 23. Consequently said bearing is held in place by the bolts 25 by which the casing 23 is secured to the frame 13, but may readily be removed when necessary. Said bearing extends down through the opening in the frame 13, as well as up into the lower end of the casing so that an extended support is provided for the standard. As shown in Fig. 1, a sleeve 14ª is mounted on the portion 14 of the standard between it and the bearing 28 to take the wear. This sleeve may be removed and replaced when desired. It will be understood that the standard is adapted not only to rotate in the bearings 27, 28, but also to move longitudinally through them under the action of the springs 22. It should be noted that by locating the springs 22 between the upper and lower bearings 27 and 28 it is possible to obtain a considerable spacing between the bearings and to use springs of considerable length within a structure of relatively short, vertical dimension. 29 indicates a steering post provided at its upper end with a steering wheel 30 that is secured thereto in any usual manner. This steering post is necessarily connected with the standard that is journaled in the casing 23, but while such connection must be of a character to permit of controlling the turning of the standard and its attached wheel so as to properly guide the machine, it is undesirable to have such post partake of the frequent vertical movements that are imparted to the standard because of the wheel 11 passing over uneven surfaces. For the latter reason the post 29 and the standard are telescopically connected. In order that the turning of the post may, however, control the turning of the wheel, the lower end portion of such post is provided, in the construction shown, with a series of comparatively long ribs 31 that engage with correspondingly-shaped grooves that are formed in the upper end of the member 15 of the hollow standard, such upper end being thickened as at 32 to form a strong and heavy head in which the grooves for the ribs 31 are formed. By this construction it will be evident that while the post and the standard are non-rotatably connected together, so that they turn axially in unison, there is permitted a vertical movement of the standard that will not be imparted to the post and its attached hand wheel 30, whereby the operator who has hold of such hand wheel is freed from the shocks and jars incident to the supporting wheel 11 passing over uneven surfaces that he would otherwise sustain.

33 indicates a cap that is secured in any suitable manner as by a pin 33ª to the lower part of the post 29, and is of a size and shape to fit snugly over the upper reduced end of the casing 23, and in order that it may be secured in place and at the same time be freely rotatable with the post 29, it is provided near its lower edge with a plurality of short screws 34 that project into a groove 35 cut in the wall of said reduced part of the casing. The provision of these screws that enter the groove thus provides ready means for enabling the cap to be attached and detached, and at the same time will of course permit the required rotation of the cap with the post. Furthermore, inasmuch as said screws hold the cap on the upper end of the casing, and the cap is secured to the steering post 29, said cap serves the purpose of holding the steering post in place, but it may obviously be removed by disconnecting the cap from the casing. The cap 33 encloses the upper end 15 of the standard, and also serves to secure the bearing 27 in place, since, as shown in Fig. 1, it overlies the flange 27ª of said bearing, being provided with an offset portion or recess to receive said flange. By removing the cap, said bearing is exposed so that it may readily be removed. The cap is to be made, as shown in Fig. 1, of sufficient height so as to permit of the desired independent vertical movement of the standard when the supporting wheel 11 passes over an obstruction. The interior of this cap, when applied as shown, provides a chamber well adapted to receive lubricating oil for lubricating the various bearings, and it is so utilized by the provision of an oil cup 36 that has a hollow stem screw-threaded into the wall of the cap and communicating with a duct 37 passing through such wall. It is evident that as the standard is independently moved up and down, the lubricating oil that has passed into the cap will tend to be compressed and forced down between the upper bearing 27 and the bearing face of the standard, and will drip from there down to and around the thrust bearing formed by the parts 17, 18 and 19, and thereafter drip down to and lubricate the lower bearing 28, thus keeping all of the bearing parts well lubricated. We preferably secure around the head portion 32 of the standard a diametrically split ring 38 that fits quite closely against the inner face of the cap and by its action as a plunger against the oil that enters the cap aids in forcing the oil downward as described. The ring 38 also serves the purpose of preventing disconnection of the steering standard and the casing 23 so long as the cap 33 is in place.

From the description given, it will be evident that the parts can be very readily assembled and disassembled when required, and that when in operative position they will so function as to relieve the operator to a very large extent of the constant jars and shocks that he would be subjected to if no provision for independent movement of the supporting wheel standard were provided.

What we claim as our invention and desire to secure by Letters Patent, is—

1. In a steering apparatus for vehicles, the combination of a frame, a dirigible wheeled support therefor, a standard rising from and connected with said support, a plurality of laterally spaced coiled springs grouped around the outside of said standard, anti-friction devices supporting the lower ends of said springs on said standard, a casing secured to said frame and surrounding said standard and springs and bearing upon the upper ends of said springs, and a steering post telescopically but non-rotatably connected coaxially with said standard.

2. In a steering apparatus for vehicles, the combination of a frame, a dirigible wheeled support therefor, a standard rising from and connected with said support, a cage comprising a base surrounding the standard and a series of arms spaced apart to provide a plurality of pockets parallel with said standard, means for supporting said cage from said standard, coiled springs in said pockets extending above the upper ends of said arms, a casing secured to said frame and surrounding said cage and bearing upon the upper ends of said springs, and a steering post telescopically but non-rotatably connected with said standard.

3. In a steering apparatus for vehicles, the combination of a frame, a dirigible wheeled support therefor, a standard rising from and connected with said support, a cage comprising a base surrounding the standard and a series of arms spaced apart to provide a plurality of pockets parallel with said standard, an anti-friction thrust bearing supported from said standard, upon which thrust bearing said cage rests, coiled springs in the pockets of the cage, said springs extending above the upper ends of said arms, a casing secured to said frame and surrounding said cage and bearing upon the upper ends of said springs, and a steering post telescopically but non-rotatably connected with said standard.

4. In a steering apparatus for vehicles, the combination of a frame, a casing secured to and rising from said frame, a dirigible wheeled support comprising a vertical standard connected with said wheeled support and journaled in upper and lower bearings in said casing, a cap swiveled to the upper end of the casing and forming an oil chamber above said upper bearing, a split ring carried by the standard within said oil chamber, resilient means within the casing bearing against both the casing and the standard for normally exerting downward pressure on said wheeled support, and a steering post secured to said swiveled cap and extending therethrough, said steering post being telescopically but non-rotatably connected coaxially with said standard.

5. In a steering apparatus for vehicles, the combination of a vehicle frame, a dirigible wheeled support therefor comprising a cylindrical standard extending upward through said frame, a casing enclosing said standard and removably secured to said frame, a bearing for the lower portion of said standard through which said standard is adapted to move longitudinally and rotatably, said bearing having an external annular rib secured between said casing and said frame, a bearing for the upper end portion of said standard, a steering post telescopically and non-rotatably connected with said standard, and resilient means in said casing between said upper and lower bearings for supporting the load on said standard.

6. In a steering apparatus for vehicles, the combination of a vehicle frame, a dirigible wheeled support therefor comprising a cylindrical standard extending upward through said frame, a casing secured to said frame and enclosing said standard, a bearing carried by said casing for the upper end portion of said standard, a bearing for the lower end portion of said standard, a steering post coaxial with said standard and telescopically and non-rotatably connected therewith, a cap detachably secured to said casing and arranged to hold said steering post against endwise movement relatively to said casing, said standard extending up into said cap, means carried by the standard within said cap for normally preventing the withdrawal of said standard from said casing, and resilient means within said casing between said upper and lower bearings for transmitting the load to said standard.

7. In a steering apparatus for vehicles, the combination of a vehicle frame, a dirigible wheeled support therefor comprising a cylindrical standard extending upward through said frame, a casing secured to said frame and enclosing said standard, a bearing carried by said casing for the upper end portion of said standard, a bearing for the lower end portion of said standard, a steering post coaxial with said standard and telescopically and non-rotatably connected therewith, a cap arranged to hold said steering post against endwise movement relatively to said casing, said standard extending up into said cap, a split ring carried by the standard within said cap for normally preventing the withdrawal of said standard from said casing, and resilient means within said casing for transmitting the load to said standard.

8. In a steering apparatus for vehicles, the combination of a frame, a dirigible wheeled support therefor, a standard rising from and connected with said support, a cage comprising a base surrounding the standard and a series of arms spaced apart to provide a plurality of pockets parallel with said standard, means for supporting said cage on said standard to permit rotation of the standard relatively thereto, coiled springs in said pockets extending above the upper ends of said arms, a casing secured to said frame and surrounding said cage and bearing upon the upper ends of said springs, means at the upper end of said standard for securing said standard and casing together, and a steering post telescopically but non-rotatably connected coaxially with said standard.

9. In a steering apparatus for vehicles, the combination of a frame, a dirigible wheeled support therefor, a standard rising from and connected with said support, a cage comprising a base surrounding the standard and a series of arms spaced apart to provide a plurality of pockets parallel with said standard, means for supporting said cage on said standard to permit rotation of the standard relatively thereto, coiled springs in said pockets extending above the upper ends of said arms, a casing secured to said frame and surrounding said cage and bearing upon the upper ends of said springs, a bearing in said casing for the upper portion of said standard, means at the upper end portion of said standard for securing said standard and casing together comprising a split ring secured to said standard above and extending over the upper end of said bearing, a cap enclosing said ring and rotatably secured to the upper end of the casing, a steering post telescopically but non-rotatably connected co-axially with said standard, and a bearing for the lower portion of said standard.

10. In a steering apparatus for vehicles, the combination of a frame, a casing secured to and rising from said frame, a dirigible wheeled support for the frame comprising a vertical standard connected with said wheeled support and journaled in upper and lower bearings in said casing for rotative movement, an anti-friction bearing having end thrust engagement with said standard within said casing, resilient means within the casing between said upper and lower bearings and bearing against both the casing and said anti-friction bearing for normally exerting downward pressure on said wheeled support, a cap rotatably connected with the upper end of the casing, and a steering post fixedly secured to said cap and extending therethrough, said steering post being telescopically but non-rotatably connected coaxially with said standard.

11. In a steering apparatus for vehicles, the combination of a frame, a casing secured to and rising from said frame, a dirigible wheeled support for said frame comprising a vertical standard connected with said wheeled support and journaled to move longitudinally and rotatably in upper and lower bearings in said casing, a cap on the upper end of the casing and forming an oil chamber above said upper bearing, means carried by said standard within said oil chamber and operative by relative vertical movement between said standard and said chamber to force oil down through said upper bearing, resilient means within the casing between said upper and lower bearings and bearing against both the casing and the standard for normally exerting downward pressure on said wheeled support, and a steering post extending through said cap and connected coaxially with said standard.

12. In a steering apparatus for vehicles, the combination of a vehicle frame, a dirigible wheeled support therefor comprising a cylindrical standard extending upward through said frame, a casing enclosing said standard and secured to said frame, upper and lower bearings in said casing for the upper and lower portions of said standard, resilient means in said casing for yieldingly supporting the load on said standard, a cap rotatably mounted on the upper portion of said casing, said cap being held against endwise movement on said casing, and a steering post rigidly secured to said cap and telescopically and non-rotatably connected with the upper portion of said standard.

13. In a steering apparatus for vehicles, the combination of a vehicle frame, a dirigible wheeled support therefor comprising a cylindrical standard extending upward through said frame, a casing secured to said frame and enclosing said standard, a bearing carried by said casing for the upper end portion of said standard, a bearing for the lower end portion of said standard, a steering post coaxial with said standard and telescopically and non-rotatively connected therewith, a cap rotatably mounted on the upper end of said casing, means connecting said cap and said casing to permit rotation of said cap but to hold the latter against endwise movement on said casing, said means being releasable to permit removal of said cap, said steering post being rigidly connected to said cap, and resilient means within said casing between said upper and lower bearings for transmitting the load to said standard.

14. In a steering apparatus for vehicles, the combination of a vehicle frame, a dirigible wheeled support therefor comprising a cylindrical standard extending upward through said frame, a casing secured to said frame and enclosing said standard, a bearing carried by said casing for the upper end portion of said standard, a bearing for the lower end portion of said standard, resilient means in said casing for yieldingly supporting the load on said standard, a steering post coaxial with said standard and telescopically and non-rotatably connected therewith, a cap arranged to hold said steering post against endwise movement relatively to said casing, said standard extending up into said cap, said cap forming an oil chamber above said upper bearing, plunger means carried by said standard within said cap and operative by relative vertical movement between said standard and said cap to force oil down through said upper bearing, and means for introducing oil into said chamber at a point below said plunger means.

FREDERICK W. BURGER.
BERGER STOCKFLETH.